United States Patent [19]
Candellero et al.

[11] 3,834,499
[45] Sept. 10, 1974

[54] CLUTCH, BRAKE AND MOTOR CONTROLS FOR SYNCHRONIZED GEAR SHIFTING

[75] Inventors: Giovanni Candellero; Stefano Aimo, both of Turin, Italy

[73] Assignee: FIAT Societa per Azioni, Turin, Italy

[22] Filed: Sept. 25, 1972

[21] Appl. No.: 292,035

[30] Foreign Application Priority Data
Sept. 25, 1971   Italy..................................  70163/71

[52] U.S. Cl................ 192/.09, 192/.033, 192/4 A, 192/3.58, 74/339, 74/340
[51] Int. Cl....................... B60k 29/00, B60k 21/00
[58] Field of Search.......... 192/.033, .09, .092, 4 A, 192/3.56, 3.58; 74/339, 340

[56] References Cited
UNITED STATES PATENTS

| | | | |
|---|---|---|---|
| 3,103,826 | 9/1963 | Jaeschke....................... | 192/3.58 X |
| 3,417,640 | 12/1968 | Schmidt et al................ | 192/.092 X |
| 3,478,851 | 11/1969 | Smyth et al...................... | 74/339 X |
| 3,548,980 | 12/1970 | Schmidt............................. | 192/4 A |
| 3,645,366 | 2/1972 | Numazawa et al. ............... | 192/3.56 |

*Primary Examiner*—Benjamin W. Wyche
*Attorney, Agent, or Firm*—Sughrue, Rothwell, Mion, Zinn & Macpeak

[57] ABSTRACT

This invention provides an electronic gear synchronisation system for a motor vehicle gear box in which the input and output shaft speeds are recorded by respective transducers and the respective speed signals provided thereby are utilised in an electronic control unit to control the selective operation of accelerator means (e.g., the vehicle engine) and decelerator means (e.g., a shaft brake) acting on the gearbox input shaft so as to bring the ratio of the speeds of the input and output shafts into conformity with the preselected gear ratio, in a short time interval between disengagement of one pair of gears and engagement of another selected pair of gears.

4 Claims, 6 Drawing Figures

CLUTCH, BRAKE AND MOTOR CONTROLS FOR SYNCHRONIZED GEAR SHIFTING

The present invention relates to gear changing systems, particularly for automobiles.

BACKGROUND OF THE INVENTION

When changing gear in vehicles having "crash" gearboxes without synchromesh the driver must increase or decrease the speed of the input shaft of the gearbox relative to that of the output shaft, while in neutral gear, when changing to a lower or to a higher gear respectively. Although a decrease in the speed of the input shaft takes place relatively quickly by momentarily releasing the accelerator pedal (i.e., closing the engine throttle), in changing to a lower gear it is necessary to speed up the engine with the gear in neutral and with the clutch engaged, a delicate operation requiring skill and practice on the part of the driver.

To free the driver from the necessity of being preoccupied with gear synchronization during gear changing, it is already known to provide gear synchronizing rings in a so-called synchromesh gearbox which, during a gear change, equalise the speeds of gears before their inter-engagement. The use of such synchronizing rings, however, whilst freeing the driver from concern over gear synchronization during a gear change, necessarily reduces the rapidity with which the speeds of the input and output shafts of the gearbox can be equalized and thus precludes the possibility of achieving the rapidity of gear changing which is characteristic of a crash gear box skilfully used, unless the force on the gears is increased, thereby increasing the stress on the gears to such an extent that rapid seizing of the synchronizing rings may occur.

An object of the present invention is to provide a gear changing system with electronic synchronization which effects the desired synchronization with the rapidity characteristic of manual operation, substantially reducing the synchronization times required in gear changing using conventional gear synchronizing rings.

SUMMARY OF THE INVENTION

According to the present invention there is provided a gear changing system for motor vehicles comprising a synchromesh gearbox having an input shaft connectable to the vehicle engine by means of a friction clutch and an output shaft connectable to the driving wheels of the vehicle, the input shaft being adapted to be connected to the output shaft through pairs of selectively inter-engageable gears, characterised in that the respective pairs of gears are engageable by respective actuators controlled electrically by electronic control circuits adapted to effect interengagement of a selected pair of gears and, after disengagement of the pair of gears originally inter-engaged, to effect operation selectively of accelerator means and decelerator means acting on the gearbox input shaft prior to engagement of the preselected pair of gears in such manner as to bring the ratio between the speed signals supplied by respective speed detecting devices associated with the input shaft and the output shaft to a value corresponding to the transmission ratio of the preselected pair of gears.

BRIEF DESCRIPTION OF THE DRAWINGS

Preferred embodiments of this invention will now be described, by way of example, with reference to the accompanying drawings, in which.

DETAILED DESCRIPTION OF THE ILLUSTRATED EMBODIMENTS

Figure 1:
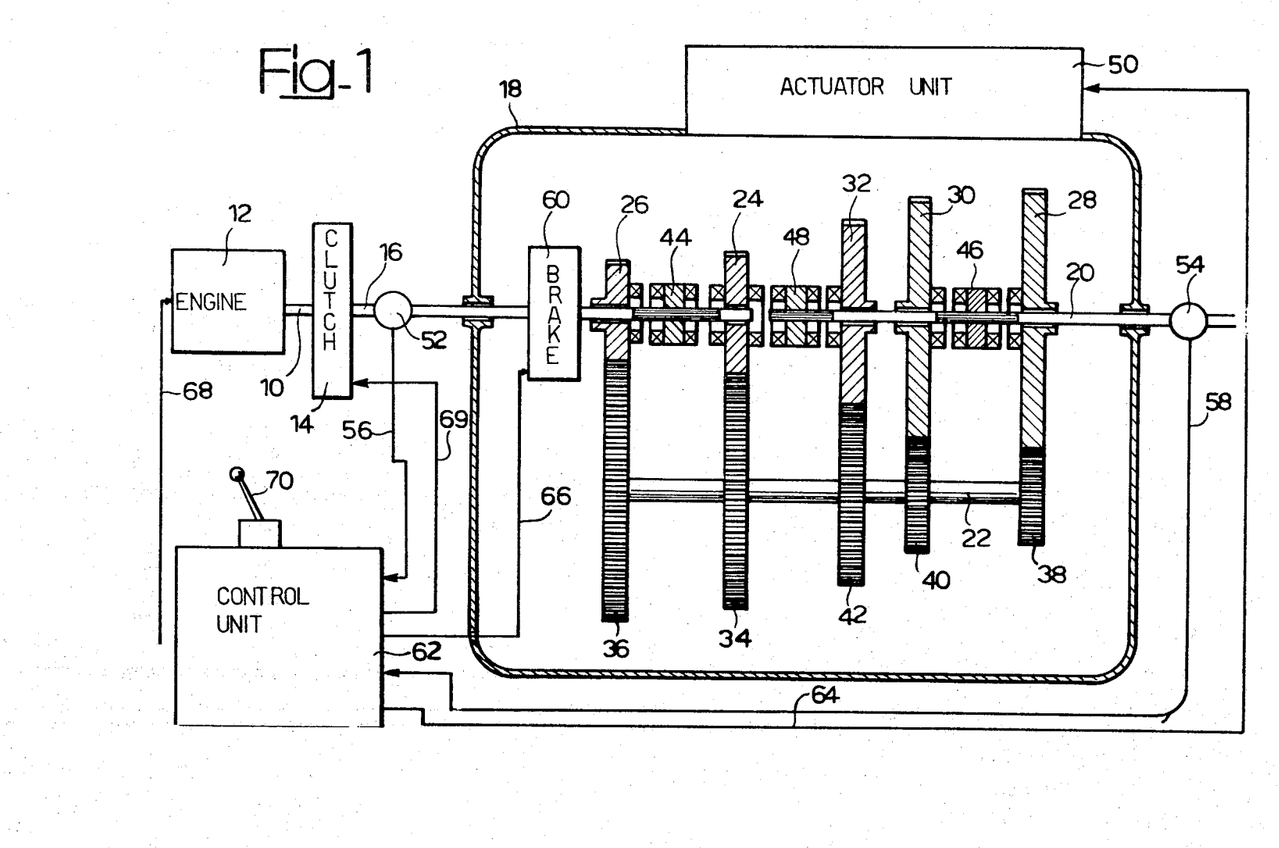
FIG. 1 is a schematic diagram of a gear-changing system with automatic synchronization according to one embodiment of the invention.

Referring first to FIG. 1 there is shown a drive shaft 10 driven by an engine 12, for example of an automobile. The engine 12, may for example be an internal combustion engine coupled through a friction clutch 14 to an input shaft 16 of a gearbox 18. The gearbox 18 has an output shaft 20 and a lay shaft 22. Loosely mounted on the input shaft 16 are a pinion 24 for normal running speeds and a pinion 26 for reduced speeds. Loosely mounted on the output shaft 20 are a pinion 28 for the first gear speed, a pinion 30 for second gear and a pinion wheel 32 for third gear. Upon the lay shift 22 are keyed a pinion 34 which meshes with the pinion 24, a pinion 36 meshing with the pinion 26, a pinion 38 meshing with the pinion 28, a pinion 40 meshing with the pinion 30 and a pinion 42 meshing with the pinion 32. A sleeve 44, splined to the input shaft 16 can be displaced along the shaft 16 to connect the latter drivingly either to the pinion 24 or the pinion 26 as desired. A sleeve 46 splined to the output shaft 20 can similarly connect the latter drivingly to the pinion 28 or the pinion 30, as desired. Finally a sleeve 48 splined to the output shaft 20 can connect the latter drivingly with the pinion 32 or the pinion 24, as desired.

Axial displacement of the respective sleeve 44, 46, 48 is controlled by respective actuators of an actuator unit shown diagrammatically at 50 and described in more detail hereinafter.

A rotational speed pick-up transducer 52 is provided to detect the speed or rotation of the input shaft 16 of the gearbox 18, and a similar pick-up transducer 54 is provided to detect the speed of rotation of the output shaft 20 of the gearbox. The speed signals generated by the two pick-up transducers 52, 54 are transmitted over respective lines 56, 58 to an electronic control unit 62.

The speed pick-up transducers 52 and 54 may be of any type suitable for transforming the speed of a rotating device into an electrical signal.

The input shaft 16 of the gearbox may be provided with an electrically controlled brake 60, shown schematically.

The lines 56, 58 at the output of the speed recorders 52, 54 are connected to a control unit 62. The electronic control unit 62 controls the actuator unit 50 through lines illustrated diagrammatically by a single cable 64, and also controls the brake 60 through a line 66 and a throttle actuator device for controlling the speed of the engine 12 through a line 68. The electronic control unit 62 operates in response to movement of a manual lever 70 for selection of different gear speeds.

The electronic control unit 62 in addition controls an actuator (not shown) for the clutch 14 through a line 69.

The general operation of the synchronized gear change system according to this invention is as follows.

When the gear lever 70 is operated, the control unit 62 energises the control actuator of the friction clutch 14 through the line 69, disengaging the clutch. Comparator circuits in the unit 62 (to be described hereinafter) receive at each instant the speed signals supplied by the transducers 52, 54. While the clutch 14 is disengaged the unit 62 thus provides an error signal representing the magnitude and sign of the difference between the two speed signals, and causes the engine to reduce or increase its speed according to the sign of the error signal. Simultaneously the unit 62 effects transition from normal to a reduced gear ratio, or vice versa as required, by appropriate displacement of the sleeve 44. This transition takes place with gear synchronization of the traditional mechanical type. Finally, and simultaneously with the two above operations, the unit 62 disengages the pinion up to then engaged with the input shaft, allowing the associated sleeve to run loose.

When those three operations have been effected, the unit 62 re-engages the clutch 14, connecting the drive shaft 10 with the input shaft 16 of the gearbox. The successive behaviour of the unit 62 is now governed by the above-mentioned speed error signal $E = V_i - kV_u$, between the speed $V_u$ of the gearbox output shaft 20 and the speed $V_i$ of the input shaft 16 of the gearbox, $k$ being a constant. The unit 62 therefore continues to control the speed of the engine 10, and if necessary operates the brake 60 of the input shaft 16 in order to reduce the error signal $E$ automatically to zero.

To sum up, the successive operations effected by the electronic control unit 62 are as follows, in effecting a transition to a higher or lower gear speed than the one previously engaged:

1. Clutch 14 disengaged;
2. disengagement of the previously engaged gears; acceleration or deceleration of the engine 12; simultaneously transition from normal to reduced speed or vice versa,
3. re-engagement of clutch 14;
4. Further acceleration or deceleration of the engine 12 with operation of the brake 60 as appropriate;
5. Engagement of the gears appropriate to the new speed In both the above cases, that is, upon transition to a lower or to a higher speed, cancellation of the error signal E is effected in the control unit 62 and upon such cancellation a consent signal is automatically generated for actuation of the actuator unit 50 to engage the desired gear.

Figure 2A:
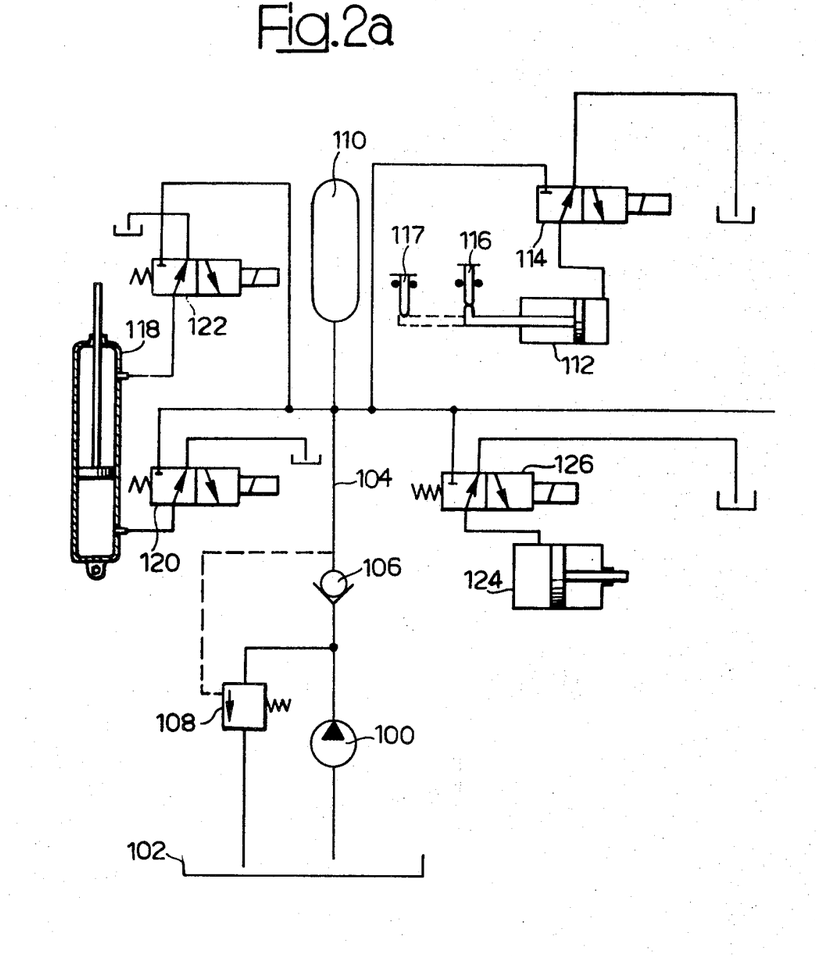
FIGS. 2a and 2b together constitute a circuit diagram of the electro-hydraulic circuits forming part of the system shown in FIG. 1.
Figure 2B:
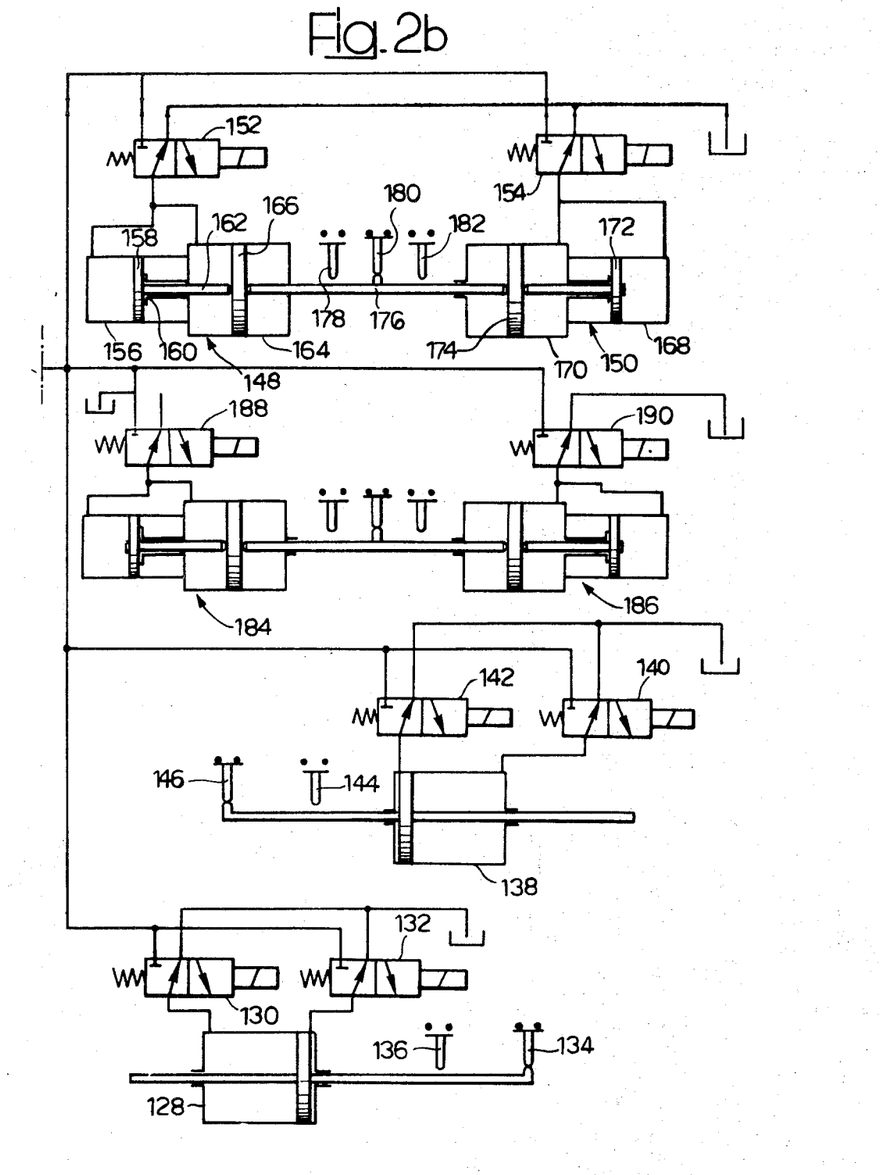

FIGS. 2a and 2b represent the hydraulic circuit interconnecting the actuators of the actuator unit 50, the friction clutch 14, the engine 12 and of the brake 60 of FIG. 1. A source of hydraulic pressure comprises a pump 100 driven for example by the engine 12 of the vehicle, and drawing hydraulic fluid from a sump 102. Fluid is supplied by the pump under pressure to a pressure accumulator 110 through a conduit 104 containing a unidirectional valve 106. A pressure-limiting by-pass valve 108 opens when the output pressure of the pump 100 exceeds a given limit to connect the pump output to the sump 102.

A single acting actuator 112 piloted by a three-way two-position solenoid valve 114 effects, upon energisation of the solenoid valve 114, disengagement of the clutch 14 (not shown in FIG. 2).

Engagement and disengagement of the clutch 14 corresponds to the piston of the actuator 112 being respectively to the right and to the left as illustrated, and these two positions are recorded by two respective microswitches 116, 117, which provide respective signals in the control unit 62 of FIG. 1.

A double-acting actuator 118 is piloted by two solenoid valves 120, 122 which respectively control deceleration and acceleration of the engine 12. The actuator 118 in the illustrated embodiment controls the fuel injection pump of the engine 12. The piston of the actuator 118 is held normally in a central or neutral position by centering springs (not shown) when the valves 120, 122 are both de-energised. In this neutral position of the piston in its cylinder, the fuel injection pump of the engine is disengaged from the actuator 118, whilst it is controlled respectively to reduce or increase the fuel supply to the engine only at the two extreme positions of the piston in the cylinder.

A single-acting actuator 124, piloted by a solenoid valve 126 with three-ways and two positions, controls the brake 60 (not shown in FIG. 2.)

A double-acting actuator 128, piloted by respective solenoid valves 130, 132 with three ways and two positions, controls selection respectively of normal and reduced gear speeds in the gearbox 18 in its two operative positions. These two operative positions are recorded by respective microswitches 134, 136 which provide respective signals in the control unit.

A further double-acting actuator 138 piloted by solenoid valves 140, 142, controls the selection respectively of neutral and reverse speeds of the gearbox 18. The two operative positions of the piston of the actuator 138 are recorded by respective microswitches 144, 146 which provide respective signals in the control unit 62.

A pair of respective double actuators 148, 150, both of the automatically centering type, are controlled by respective solenoid valves 152, 154, with three-ways and two positions. The actuators 148 and 150 control the engagement and disengagement respectively of the first and second gears.

The double actuator 148 comprises a first cylinder 156, housing a piston 158 movable between an end position to the left, as viewed in FIG. 2b, and a position abutting a stop 160. The piston 158 has a rod 162 which projects into a second cylinder 164, forming part of the actuator 148, to abut a piston 166 movable in the cylinder 164. The other double actuator of the pair, 150, is arranged symmetrically with respect to the actuator 148, and comprises two cylinders 168, 170, in which respective pistons 172, 174 slide. A rod 176 interconnects the two pistons 166 and 174 for operation of the sleeve 46.

The rod 176 has three operative positions, corresponding to engagement of the first gear, to neutral and to engagement of the second gear, these operative positions being recorded by respective micro-switches 178, 180, 182, which provide respective signals in the unit 62.

A second pair of auto-centering actuators 184, 186 controlled by solenoid valves 188, 190 with three ways and two positions, controls engagement of the third and of the fourth gear. The structure and arrangement of this second pair of double actuators is identical with the pair 148, 150, and further description thereof is not therefore deemed necessary.

The solenoids of all the valves in the circuit of FIGS. 2a and 2b are controlled by respective signals supplied by the control unit 62.

During running in normal first gear all the solenoid valves are de-energised, and all the actuators controlled thereby are in the appropriate positions controlled thereby. Thus the piston of the actuator 112 is at the extreme right-hand end of its stroke (as viewed in FIG. 2a) to enable the friction clutch 14 to remain engaged. The microswitch 116 is closed, signalling engaged state of the clutch to the unit 62. The piston of the actuator 124 is at the extreme left-hand end of its stroke, so that the brake 60 is inoperative. The actuator 118 has no effect on the engine fuel pump, which is therefore controlled only by the accelerator pedal under control of the driver. The reversing gear is in neutral and this situation is signalled to the control unit 62 by the microswitch 146. The piston of the actuator 128 for normal/reduced speed selection is at the right hand end of its stroke, to maintain normal transmission and this is signalled to the unit 62 by closure of the microswitch 134.

The pistons 158, 166 of the auto-centering double actuator 148 are at the left-hand ends of their strokes while the piston 172 of the double actuator 150 abuts its stop and the piston 174 is at the left hand end of its stroke. In such a situation the rod 176 is in a stable position at the exterme left, to maintain the first gear engaged, this situation being signalled at the control unit 62 by closure of the microswitch 178.

The pair of double actuators 184, 186 is in the central neutral position in which the sleeve 48 controlled thereby is disengaged from both the pinions 24, 32 associated with it.

Upon operation of the lever 70 to select, for example, second gear in the reduced speed range, the solenoid valve 114 (FIG. 2a) is energised, admitting pressure to the actuator cylinder 112 to disengage the clutch 14, and confirming such disengagement to the control unit 62 by opening of the microswitch 117, located at about the half-stroke position of the co-operating part of the piston of actuator 112.

The opening of the microswitch 117 upon disengagement of the clutch 14, energises the solenoid valve 120 to slow down the engine 12. Simultaneously the control unit 62 energises the two solenoid valves 152, 154 (FIG. 2b) causing the rod 176 to be subjected to a force from the left either due to the pressure on the piston 166 or due to the pressure upon the piston 158, and the rod 162 of which bears against the piston 166. This leftward force upon the rod 176 is counteracted solely by the force acting upon the piston 174, so that the rod 176 moves towards the right, but only as far as the central position: in the central position equilibrium of the pressures in the two pairs of actuators 148, 150 is achieved, as is evident from FIG. 2b, so that the rod 176 stops, having disengaged the sleeve 46 from the pinion 28 of the first gear, but not yet engaged the sleeve 46 with the pinion 30 of the second gear.

The gearbox 18 is therefore in neutral, and this situation is signalled to the contorl unit 62 by closure of the microswitch 180, which allows de-energisation of the solenoid valves 152, 154.

When the piston of the actuator 112 has been displaced to about its mid-stroke position the microswitch 117 is opened, whereupon the control unit 62 energises the solenoid valve 132 to disengage the normal gear ratio and engage the reduced gear ratio. The mechanical synchronisers easily effect synchronisation during this transition due to low inertia of the rotating masses concerned.

When the control unit 62 receives the signals from the microswitches 180, 136 the solenoid valve 114 becomes energised with the re-engagement of the clutch 14. Control of the speed of the engine 10 continues and the brake 60 is operated under ocntorl of the signals provided by the speed pick-up transducers 52, 54 for the purpose of annulling the previously mentioned error signal and bringing the speed of the input shaft 16 to a valve which, relative to the speed of the output shaft 20, remains in a ratio corresponding to the speed ratio of the second gear in the reduced speed range, described hereinafter, with reference to FIG. 3.

Annulment of the error signal in the control unit 62 allows energisation of the solenoid valve 152 to cause displacement of the rod 176 to the extreme right-hand position, in which the sleeve 46 is engaged with the pinion 30 of reduced second speed, while at the same time closing the microswitch 182. Such closure causes, through the control unit 62, the de-energisation of all the solenoid valves.

For effecting transition from high to low speed ratio, for example from second gear to first gear, the sequence of operations would be analogous to that described, except that the solenoid valve 126 for operating the brake 60 would not be energised. In this case the solenoid valve 122 would be energised in place of the solenoid valve 120, to increase the fuel supply to the engine 12 and thus accelerate it.

It will be apparent to those skilled in the art that any other change speed gear could be controlled in a manner analogous to that described.

It will be appreciated that in order for a given gear to be engaged, it is necessary not only that the speed error signal be annulled, but also that consent signals be provided, in effect by closure of the associated neutral switches, such as the switch 180, the neutral reverse switch 146, and one of the switches 134, 136.

Figure 3:
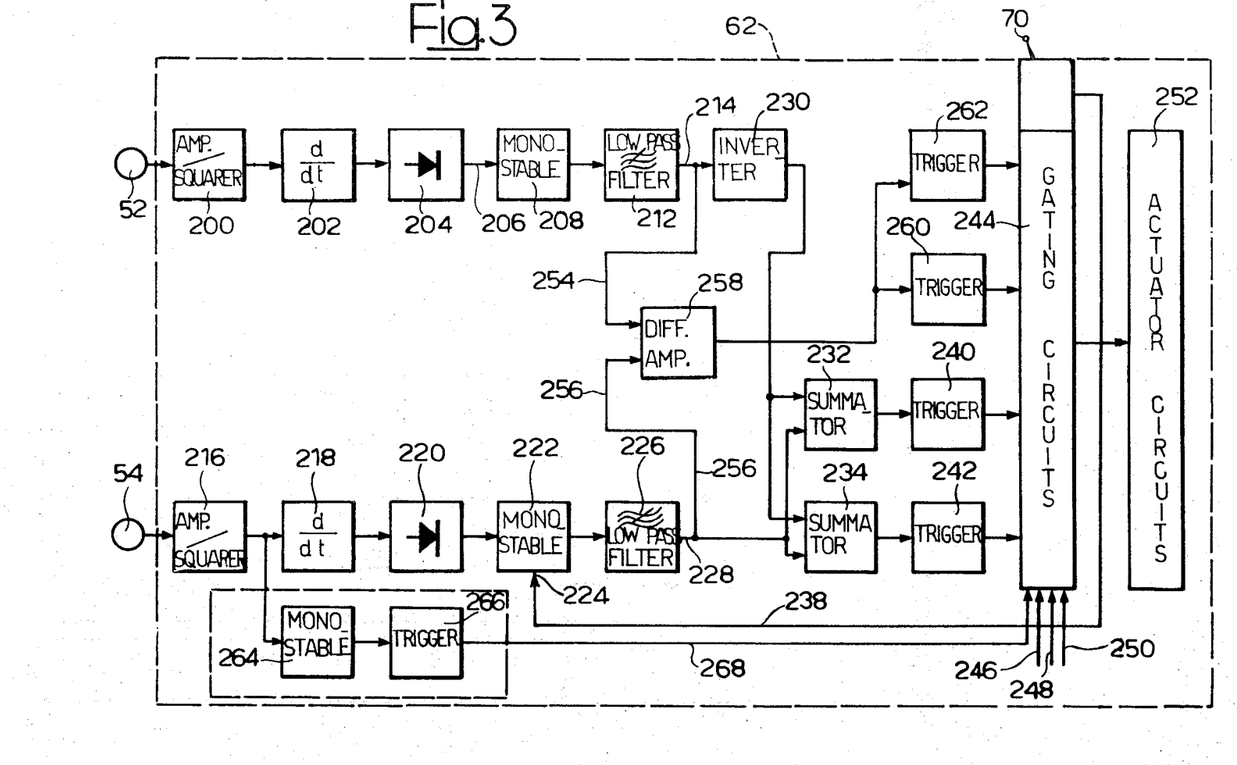
FIG. 3 is a block diagram of an electronic control unit forming part of the gear changing system of FIG. 1.

With reference to FIG. 3, a description will now be given of a preferred embodiment of an electronic control unit capable of fulfilling the functions of the unit 62 described above.

The speed pick-up transducer 52 associated with the input shaft 16 o the gearbox 18 is connected to the input of an amplifier-squarer 200 in the unit 62. The output of the amplifier-squarer is differentiated and rectified successively in a differentiator 202 and rectifier 204. The output of the rectifier 204 on line 206, is constituted by a succession of short positive pulses, of repetition frequency proportional to the angular speed of the shaft 16. This succession of positive pulses is applied to the input of a monostable multivibrator 208, which generates a succession of pulses of constant amplitude and length with a repetition frequency proportional to the speed of rotation of the input shaft 16. This signal is filtered in a low-pass filter 212, which provides on an output line 214 a positive direct voltage signal, the magnitude of which is proportional to the speed of rotation of the gearbox input shaft 16.

The rotational speed pick-up transducer 54 associated with the gearbox output shaft 20 is similarly connected to a chain of circuits comprising in series an amplifier-squarer 216, a differentiator 218, a rectifier 220, a monostable multivibrator 222 the time constant of which is controllable through an input 224, and a low-pass filter 226. The output line 228 of the filter is a direct voltage of magnitude proportional to the speed of rotation of the gearbox output shaft 20.

The direct voltage signals representing the speeds of the input shaft and output shaft respectively are passed via the respective lines 214 and 228, after inversion of the signal on line 214 in an inverter 230, to the respective first and second inputs respectively of two summators 232, 234 in which the two input voltages are added algebraically. The output signals of the summators 232 and 234 will be negative when the input shaft 16 rotates faster than the output shaft 20, and conversely these outputs will be positive when the input shaft speed is lower than the output shaft speed, supposing that the two monostable multivibrators 208, 222 have the same time constant. In the case, however, in which the time constants of the monostable multivibrators 208, 222 have a ratio other than one, the summator output signals will be negative when the speeds of the input and output shafts have a ratio greater than the ratio of the time constants of the two monostables and positive when the ratio of input to output shaft speed is less than the time constant ratio of the respective multivibrators.

The time constant of the monostable multivibrator 222 is cause to be variable, through its control input 224, by the operation of the speed selection lever 70 through a line 238, the variation being such that the ratio between the time constants of the monostable multivibrators 208, 222 corresponds to the transmission ratio of the preselected speed. Such a result may be obtained readily by varying the value of the capacitance which determines the time constant of the monostable multivibrator 222, for example by the insertion or exclusion of one or more capacitors (not shown).

The outputs of the two summators 232, 234 are connected respectively to the inputs of a trigger circuit 240 with a negative threshold and a trigger circuit 242 with a positive threshold. The outputs of the triggers 240, 242 are passed through logical gating circuits 244 controlled by consent signals provided by the various microswitches of FIGS. 2a and 2b through lines 246, 248, 250 . . . to energise actuator circuits 252 respectively for the control of acceleration of the engine 12, deceleration of the engine, and operation of the gearbox brake 60.

Control of the engine speed and gearbox brake 60 must necessarily cease upon attaining the synchronization required between the speeds of the input and output shafts of the gearbox. For such purpose the speed signals present on the lines 214, 228 are applied through lines 254, 256, to the two inputs of a differential amplifier 258. The differential amplifier 258 has a derivative action, obtained by the inclusion of a differentiating capacitance-resistance input network, for the purpose of accelerating the response of the system, and compensating for the inherent delay due to the inertia of the hydro-mechanical parts of the system. The derivative output of the differential amplifier 258 is applied to a trigger 260 with positive threshold and to a trigger 262 with negative threshold, the values of the thresholds being determined in such manner as to define an interval of tolerance of synchronization about zero.

When the output signal of the differential amplifier 258 is below the threshold of the trigger 260 with positive threshold and above the threshold of the trigger 262 with negative threshold, the triggers 240 and 242 are interdicted and, synchronization being now established, consent is given for changing gear by the actuator.

For the purpose of allowing gear preselection with the vehicle stationary, the circuit also includes a detector which indicates when the vehicle is stationary. This detector is constituted by a monostable multivibrator 264 the input of which connected to the output of the amplifier-squareer 216, and a trigger circuit 266 connected to the output of the multivibrator. The trigger circuit 266 provides on an output line 268 a signal indicating that the vehicle is stationary, this signal enabling the logic gating circuits 244 to permit the sequence for selecting the initial gear speed.

No description will be given of the logic gating circuits 244, since they may be constructed according to well-known logic circuit criteria to have the above-described functional characteristics.

Figure 5:
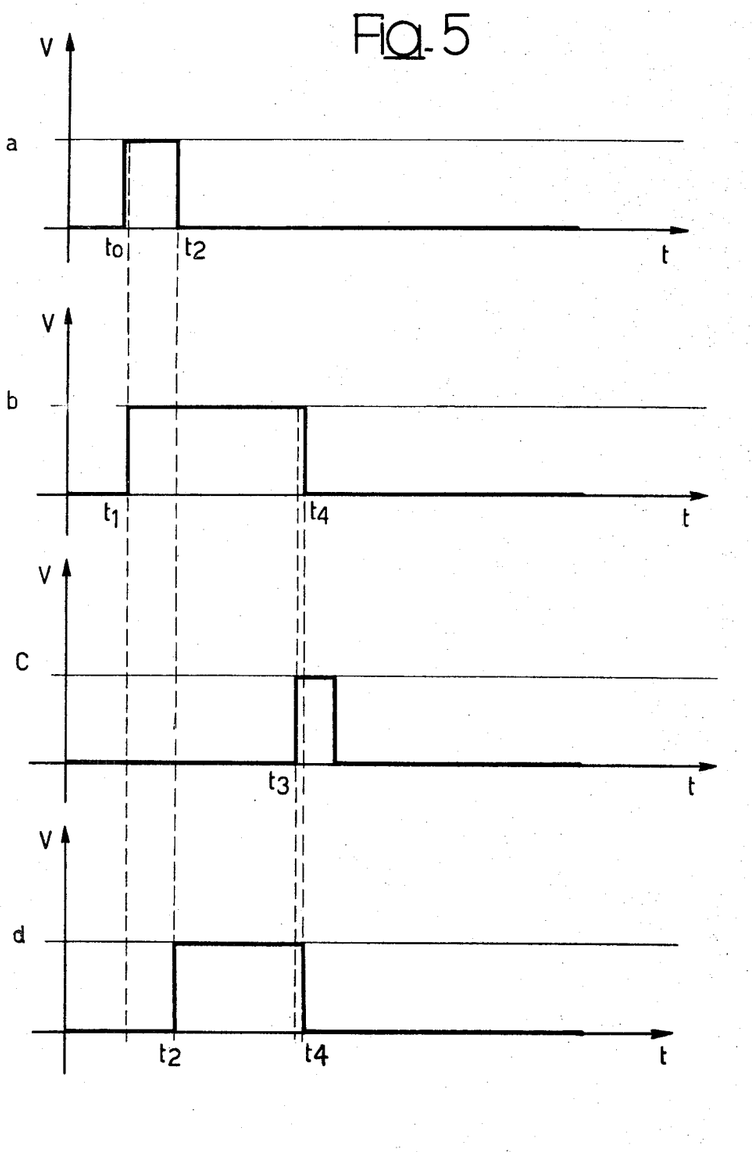
FIG. 5 depicts graphically the sequence of functions typical of the system according to the invention.

An example will now be given of a typical sequence of operation of the gear changing system, with reference to FIG. 5, to assist appreciation of the advantages of this invention.

In graph $a$, a control signal for disengagement of the clutch 14 appears at the instant $t_o$, under control of the driver. At the instant $t_1$, after a very slight delay fixed relative to the instant $t_o$, the electronic control unit 62 provides a control signal for the accelerator or brake of the engine (graph $b$) according to the sign of the difference between the speed signals as recorded by the pick-up transducers 52, 54 (apart from any proportionality factors in any one particular case, as explained above).

At the instant $t_2$ a switch records completion of disengagement of the clutch 14 and terminates the clutch disengagement control signal (graph $a$). Simultaneously there is generated a control signal applied to the brake of the gear-box or of a clutch in the gear-box (not shown) as shown in graph $d$.

The control signal for engine acceleration or braking of the engine (graph $b$) is kept high until, at the instant $t_3$, the difference between the aforementioned speed signals falls below a prefixed threshold; at this point the signal of graph $d$ is terminated, whilst there is also generated a control signal for re-engagement of the clutch (graph $c$), of suitable fixed duration. At the instant $t_4$, when cancellation of the abovementioned speed difference shows inter alia that clutch re-engagement has been obtained, the control signal for acceleration or braking of the engine is also interrupted.

A preferred embodiment of this invention has been described, which is capable of many variations, within the scope of the lcaims and in the spirit of the present invention. For example, transition from the normal gear ratio to the reduced ratio, which is synchronized through synchronizar rings in the embodiment illustrated, could also be synchronized electronically employing the principle of this invention. Moreover, the number of gear speeds may vary, and it is also possible to vary the arrangements of the diverse components such as the gearbox brake 60 and the speed pick-ups 52, 54. The brake may be arranged for example, ahead of the clutch 14 or on the lay shaft 22. Moreover, the speed pick-up transducer 52 could, in the embodiment of FIG. 1, be fitted to record the speed of the drive shaft 10 or again, of the lay shaft 22 rather than that of the gearbox input shaft 16, these speeds being proportional to the gearbox input shaft speed when the gear for normal running or the gear for reduced running speed is engaged.

Figure 4:
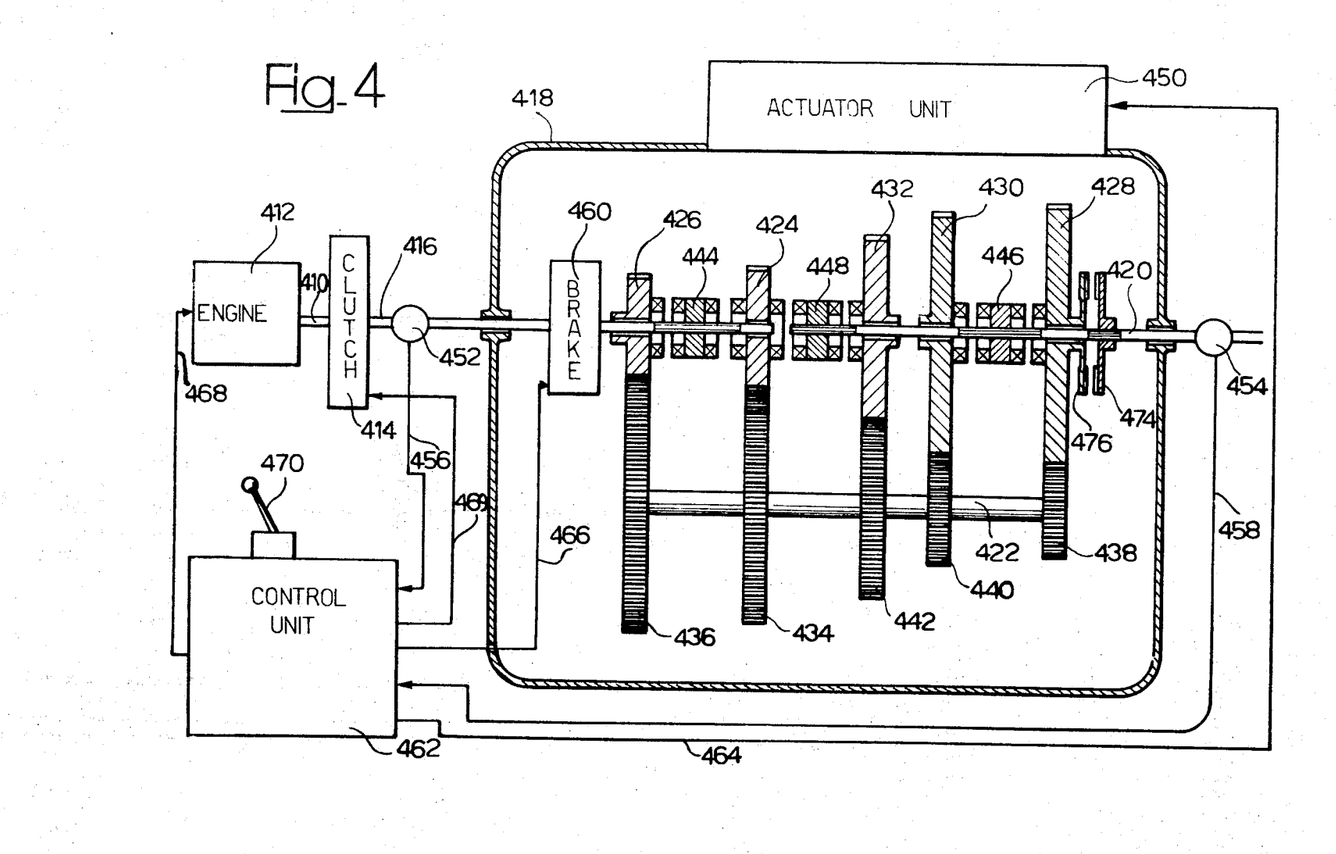
FIG. 4 is a schematic diagram of a gear-changing system according to a second embodiment of the invention.

FIG. 4 illustrates a second embodiment of the invention which differs from the embodiment illustrated in FIG. 1 only in the inclusion of a supplementary clutch in the gearbox. Parts corresponding to those in FIG. 1 are shown in FIG. 4 by the same reference numberals but increased by 400. This variant is useful when it is necessary to effect a gear change in a time still shorter than that obtainable by means of the embodiment of FIG. 1, when changing from a high gear to a lower gear.

It has been seen how in transition from a high to a low gear it is necessary, in order to obtain synchronization, to increase the spped of the gearbox input shaft and the spped of the lay shaft by accelerating the engine of the vehicle. In the embodiment of FIG. 4, direct acceleration of the lay shaft 422 is effected by providing a supplementary friction clutch having a driving disc 474 keyed to the gearbox output shaft 420 for axial displacement therealong, and a driven disc 476 integral with the pinion 428. If the pinion 428, corresponds to first gear, is engaged with the output shaft 420 through the lay shaft 422, the pinion 438 and the clutch 474, 476, as when first gear is engaged, the pinion 428 has the same velocity as the output shaft 420; when the clutch 474, 476 is disengaged, however, the pinion 428 will have a lower velocity than the output shaft 420. When first gear is engaged there is no need for intervention of the friction clutch 474, 476, because in this case transition to a lower gear is not possible, the clutch 474, 476 remaining engaged. When, on the other hand, a gear higher than first gear is engaged, then upon changing down, the clutch 474, 476, normally disengaged, is engaged momentarily in the intermediate phase in which no positive coupling exists between the lay shaft 422 and the output shaft 420 to cause acceleration of the pinion 428, which acceleration is transmitted to the lay shaft 422, and thus to all the driven pinions thereon, including the one corresponding to the gear speed which it is desired to engage; the speed of rotation of this pinion will thus be equalized with that of the output shaft 420.

Operation of the clutch 474, 476 may be effected through the medium of a further single-acting hydraulic actuator (not shown) controlled from the control unit 462 by means of a single solenoid valve with three ways and two positions.

Operation of the gear changing system of FIG. 4 as regards the successive phases of synchronization and engagement of the gears, takes place in a manner analogous to the first embodiment described with reference to FIG. 1, as will be evident to those skilled in the art.

Evidently, in both the embodiments herein described, the possibility exists for effecting the gear changes mechanically, in conditions of emergency, under traditional mechanical control. Furthermore the synchromesh gear changing system described, of semi-automatic type, may be made completely automatic by equipping it with known devices for automatic gear-changing in response to the speed of and load on the engine.

We claim:

1. A gear changing system for a motor vehicle comprising a synchromesh gear box having an input shaft connectable to the vehicle engine, a friction clutch for selectively connecting said input shaft into said vehicle engine, an output shaft shaft connectable to the driving wheels of the vehicle, pairs of selectively interchangable gears connecting the output shaft to the input shaft and manual selector means for preselecting a pair of gears for interengagement, said system further comprising accelerator and decelerator means for the engine, decelerator means for acting on said input shaft, gear acceleration clutch means operatively connecting said wheels and said output shaft, actuation means for engaging and disengaging the gears and said friction clutch, actuation means for controlling the accelerator and decelerator means and electrical circuits for controlling all of said actuator means, said electrical circuits including tachometric elements which are operatively associated with the power transmission from the engine to the gear box and with said output shaft, each of said tachometric elements being connected to respective frequency-amplitude conversion means and to means by which a ratio between the signals produced by said tachometric elements can be obtained, said ratio being equal to the value which corresponds to the transmission ratio of the selected pair of gear wheels, said electrical circuits also comprising first control means for the actuation means for engaging and disengaging the friction clutch, second control means for the actuation means for controlling the accelerator and decelerator means, third control means for the actuation means for engaging and disengaging the gears, correlation indicating means for indicating the state of engagement of said gears and said clutch activated by said actuation means and logic correlation circuits for controlling the electrical circuits for the control means whereby upon selective operation of said manual selector means said first control means will activate the actuation means for disengaging said friction clutch, said third control means will activate the actuation means for disengaging the originally engaged gears and said second control means will activate the actuation means for controlling the acceleration or deceleration means upon disengagement of said friction clutch when shifting up or down, said first control means activating the actuation means for engaging said friction clutch upon disengagement of said gears and said second control means activating the actuation means for the acceleration and deceleration means of the engine to obtain synchronization and upon synchronization said third control means activating the actuation means for engaging the preselected new gears and preventing further action of the second control means with respect to the actuation means for the accelerator and decelerator means for the engine, said second control means also controlling the activation of said gear acceleration means when shifting down during the continued activation of the actuation means or the accelerator means for the engine.

2. A gear changing system as set forth in claim 1 wherein said second control means is comprised of two summing circuits each having two inputs, one of which is connected directly to the output of the frequency-amplitude conversion means of one of said tachometric elements and the other of which is connected via an inverter to the output of the frequency-amplitude conversion means of the other of said tachometric elements, each of said summing circuits being connected to the logic correlation circuits through intermediate trigger circuits.

3. A gear changing system as set forth in claim 2 further comprising interdiction means for said trigger circuit comprising a differential amplifier having inputs connected to each of frequency-amplitude conversion means and an output connected to said logic correlation circuits through additional trigger circuits.

4. A gear changing system as set forth in claim 1 wherein said gear box includes a normal ratio gear and a reduced ratio gear each adapted to be synchronously connected to said input shaft.

* * * * *